United States Patent

Holley et al.

[19]

[11] Patent Number: 5,779,640
[45] Date of Patent: Jul. 14, 1998

[54] ULTRASOUND MULTI-BEAM DISTORTION CORRECTION SYSTEM AND METHOD

[75] Inventors: Gregory L. Holley, Mountain View; Ismayil M. Guracar, Redwood City, both of Calif.

[73] Assignee: Acuson Corporation, Mountain View, Calif.

[21] Appl. No.: 638,384

[22] Filed: Apr. 26, 1996

[51] Int. Cl.⁶ ............................................. A61B 8/00
[52] U.S. Cl. ............................................. 600/447
[58] Field of Search .................... 128/660.07, 661.01, 128/661.09–661.1; 73/625–626; 600/443, 447

[56] References Cited

U.S. PATENT DOCUMENTS

| | | | |
|---|---|---|---|
| 5,257,629 | 11/1993 | Kitney et al. | 128/661.01 |
| 5,396,285 | 3/1995 | Hedberg et al. | 128/660.04 |
| 5,429,137 | 7/1995 | Phelps et al. | 128/661.09 |
| 5,477,859 | 12/1995 | Engeler | 600/447 |
| 5,511,423 | 4/1996 | Sugiyama et al. | 600/447 X |
| 5,623,928 | 4/1997 | Wright et al. | 128/661.01 |

*Primary Examiner*—Francis Jaworski
*Attorney, Agent, or Firm*—Brinks Hofer Gilson & Lione

[57] ABSTRACT

An ultrasound imaging system of the type having a receive beamformer that acquires multiple receive beams from each respective transmit beam includes an azimuthal spatial filter which operates to correct for geometric distortions typically associated with such multi-beam imaging systems. This azimuthal spatial filter is responsive to input signals derived from the receive beams to generate a corrected signal output as a function of a selected set of receive beams and a set of filter weights. The filter weights are caused to vary in accordance with the azimuthal coordinates of the selected receive beams in order to improve performance.

17 Claims, 6 Drawing Sheets

3-BEAM COEFFICIENT WEIGHTING SEQUENCE

| LINE NUMBER | 1 | 2 | 3 | 4 | 5 | 6 | 7 |
|---|---|---|---|---|---|---|---|
| BEAM | 0 | 1 | 2 | 0 | 1 | 2 | 0 |

WEIGHTS     (1-b)   b
                 c   (1-2c)   c
                     b   (1-a-b)   a
                           a   (1-a-b)   b
                                 c   (1-2c)   c
                                       b   (1-a-b)   a

Fig. 10

4-BEAM COEFFICIENT WEIGHTING SEQUENCE

| LINE NUMBER | 1 | 2 | 3 | 4 | 5 | 6 | 7 | 8 | 9 |
|---|---|---|---|---|---|---|---|---|---|
| BEAM | 0 | 1 | 2 | 3 | 0 | 1 | 2 | 3 | 0 |

WEIGHTS (1-b0)   b0
           aI   (1-aI-bI)   bI
                 bI   (1-aI-bI)   aI
                      b0   (1-a0-b0)   a0
                             a0   (1-a0-b0)   b0
                                   aI   (1-aI-bI)   bI
                                        bI   (1-aI-bI)   aI
                                             b0   (1-a0-b0)   a0

ULTRASOUND MULTI-BEAM DISTORTION CORRECTION SYSTEM AND METHOD

BACKGROUND OF THE INVENTION

This invention relates to ultrasonic imaging systems of the type that acquire multiple receive beams from each transmit beam, and in particular to a method and apparatus for reducing geometric distortions in the images produced by such systems.

In a conventional ultrasound phased array imaging system, a transmit beamformer causes an array of transducer elements to transmit ultrasound pulses directed along an ultrasound line. Immediately after transmitting the ultrasound beam, the system switches to a receive mode, in which a receive beamformer sums and focuses echo signals arriving at the transducer elements from scatterers in the subject being imaged to form a receive beam. The ultrasound beamformer steers along a receive ultrasound line, usually but not necessarily the same as the transmit ultrasound line. The acoustic receive beams are passed to a detection block (which may be a B-mode detection block, which estimates backscatter intensity, or a motion estimator block which estimates some parameter related to tissue motion, such as velocity, variance of velocity, or energy). The output of this detection block is a function of depth in the image and will be referred to as the "detected beam". This process is repeated along the next ultrasound line, and the first and subsequent detected beams are passed to a scan converter and hence to a display device.

Figure 4:
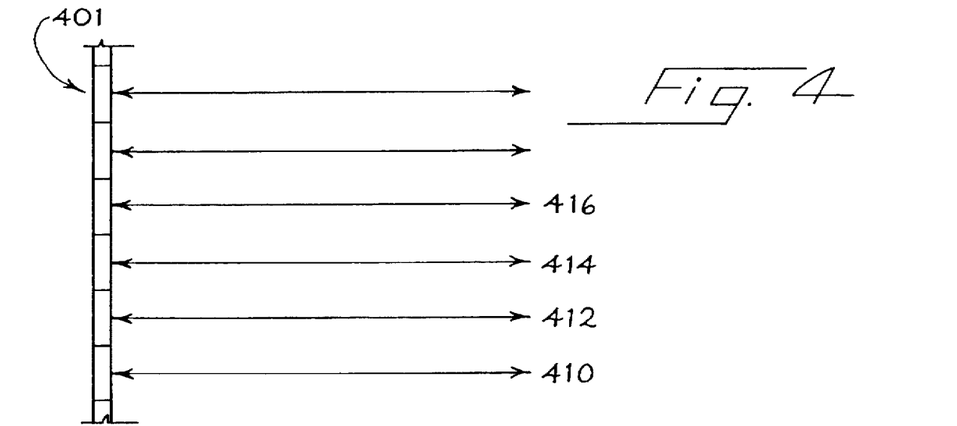
FIG. 4 is a schematic representation of a single receive beam scan.

FIG. 4 illustrates how such a single-beam receive system scans an image. Ultrasound pulses are transmitted from transducer array 401 along ultrasound line 410, then received by the transducer array, focused along the same ultrasound line 410. The process is then repeated for ultrasound lines 412, 414, 416, and so forth.

In a multi-beam ultrasound system using multiple closely-spaced receive lines, transmit pulses are transmitted along a single direction as described above. When the system switches to receive mode, multiple receive beams are acquired in parallel, and passed to the detection block. The detection block typically operates on each receive beam individually, producing one detected beam for each acoustic receive beam. The detected beams are then passed to a scan converter and display device as in the single beam case.

Figure 5:
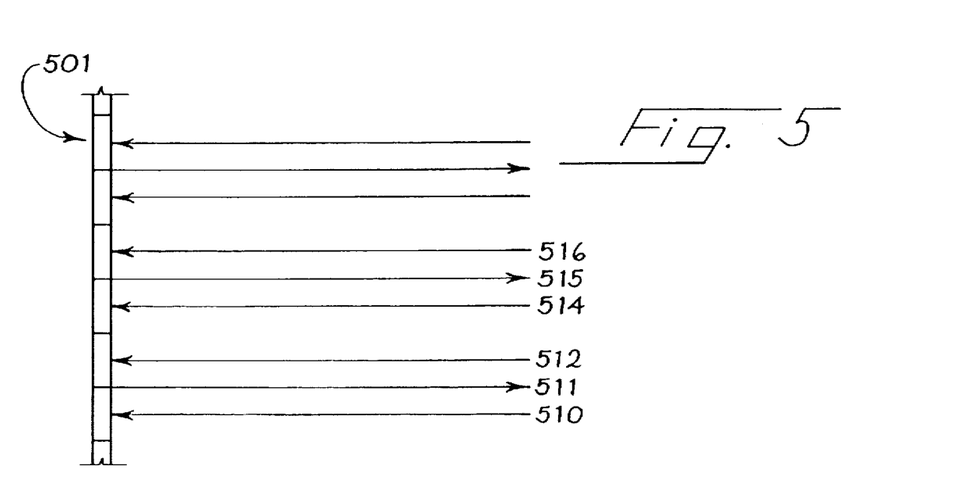
FIG. 5 is schematic representation of a dual receive beam scan.

FIG. 5 illustrates how a dual beam system scans an image. Ultrasound pulses are transmitted from transducer array 501 along transmit ultrasound line 511. Reflected echoes are detected by the transducer array, and a parallel beamformer (not shown) generates two receive beams, focused along receive ultrasound lines 510 and 512. The process is then repeated with transmission along transmit line 515 and reception along lines 514 and 516, and so forth.

In the simplest embodiments, the receive beams for all transmit lines are regularly spaced. Here "regularly spaced" means evenly spaced in some coordinate appropriate to the scan geometry. This may mean, for example, evenly spaced in position along the transducer for a linear scan, as in FIGS. 4 and 5; evenly spaced in steering angle, sine of steering angle, or 1/cos(steering angle) for a sector or vector scan; or evenly spaced in angle for a curved linear scan. A conventional scan converter displays the detected beams along regularly spaced scan lines. Regularly spaced receive beams are used, and the assumption is made that each detected beam arises primarily from scatterers along the corresponding receive ultrasound line.

However, this assumption is not generally valid.

Figure 6:
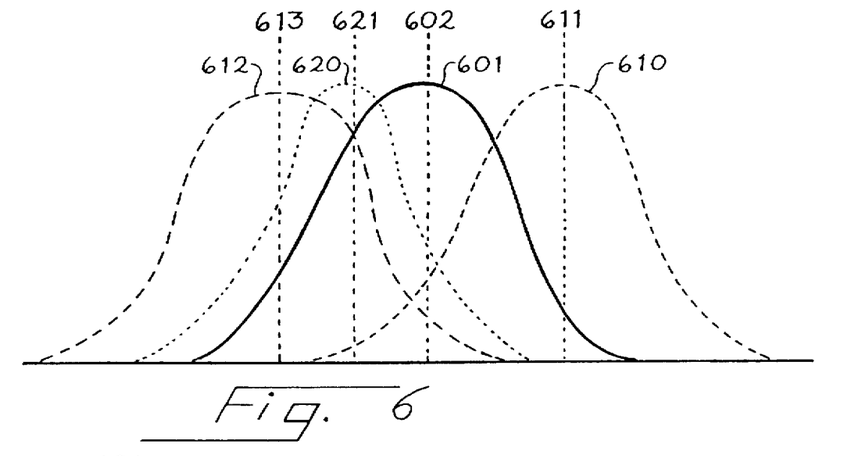
FIG. 6 is a schematic representation of transmit and receive beam profiles for the dual receive beam scan of FIG. 5.

FIG. 6 illustrates transmit, receive, and round-trip beam profiles at a single depth for a such an ultrasound system. Solid curve 601 shows a transmitted beam profile centered on a transmit ultrasound line at 602. Dashed curves 610 and 612 illustrate two receive beam profiles centered on receive ultrasound lines at 611 and 613, respectively. The round-trip response of the ultrasound system when transmitting at 602 with beam profile 601 and receiving at 613 with beam profile 612 is given by dotted-line curve 620. The center of mass of this round-trip response is shown at 621, which lies between the transmit line position 602 and the receive line position 613. Thus the ultrasound system is most sensitive to echoes from scatterers lying between the transmit and receive ultrasound lines, and not to echoes from scatterers lying on the receive ultrasound line as was assumed.

This geometric distortion effect gives rise to a highly objectionable artifact in the image. The scan converter assumes that the detected beams are regularly spaced and displays them as such. But the actual centers of mass of the detected beams are distorted—the round-trip beams acquired for a given transmit ultrasound line are "squeezed together". The result is that the various detected beams from a given transmit ultrasound line (which detected beams constitute a "transmit line group") tend to be more closely correlated to each other than they are to neighboring beams from an adjacent transmit line. In particular, the detected beam at the edge of a transmit line group is more strongly correlated to its neighbor to one side, acquired for the same transmit ultrasound line, than to its neighbor on the other side, acquired for an adjacent transmit ultrasound line. Thus a sharp boundary may be perceived between transmit line groups where no such boundary exists within transmit line groups.

Conventional remedies for this problem include reducing or defocusing the transmit aperture to broaden the transmit beam (thus reducing the geometric distortion), and smoothing the detected image to reduce the objectionable artifact. However, the former approach results in a loss of both resolution and sensitivity, while the latter approach may blur the image unacceptably.

SUMMARY OF THE INVENTION

The present invention is directed to a spatial filter which largely overcomes the disadvantages of the prior art, as discussed above.

According to this invention, an ultrasound multi-beam distortion correction system is provided for an ultrasound imaging system comprising a transmit beamformer for generating a sequence of transmit beams, a receive beamformer operative to acquire multiple receive beams from each respective transmit beam, and a display system responsive to the receive beams. The correction system of this invention comprises a spatial filter responsive to input signals derived from the receive beams to generate a corrected signal output as a function of a selected plurality of the receive beams and a plurality of filter weights, wherein the filter weights vary in accordance with the azimuthal coordinates of the selected plurality of receive beams.

DETAILED DESCRIPTION OF THE PRESENTLY PREFERRED EMBODIMENTS

The following sections will first present a general discussion and then a detailed description of the presently preferred embodiments. The final section discusses alternative embodiments.

GENERAL DISCUSSION

The preferred embodiment described below reduces the geometric distortion effect through a spatial filtering block inserted between the detection processor and the scan converter. Unlike conventional spatial filtering, the filter coefficients for this filtering block vary with the azimuthal coordinate of the detected beam. The filtering block interpolates between the available irregularly spaced detected beams to estimate the underlying detected parameter(s) at regularly spaced points. The detected parameters referred to here are preferably parameters related to scatterer motion, including parameters related to velocity, variance of velocity, and energy. However, it will be clear to one skilled in the art that the invention may be applied to other parameters, including B-mode parameters such as backscatter intensity. In the following discussion flow velocity is used by way of example.

It will be convenient both in the analysis which follows, and in calculating filter coefficients, to refer to "normalized units". Depending on scan geometry, the azimuthal ocation of a transmit line, receive line, scan line, or beam center of mass may be described by various measures, including ateral distance from the center of the array, angle, sine of angle, 1/cosine of angle, or scan line number. For the purposes of this discussion, a good measure will be one in which the scan lines are to be displayed evenly spaced. The normalized units of this discussion are formed by dividing the chosen azimuthal measure by the spacing between scan lines.

Figure 7:
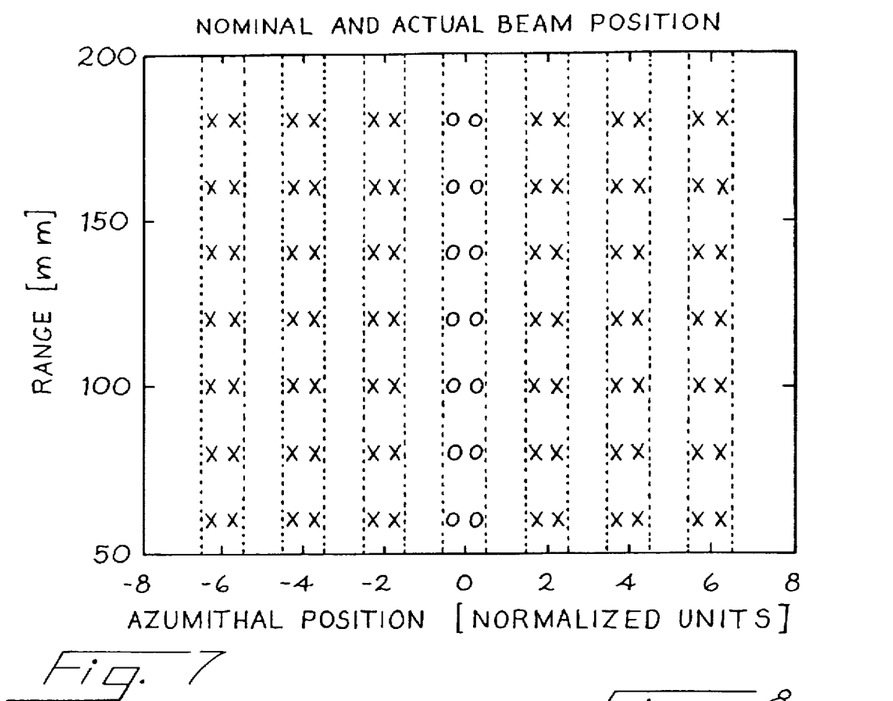
FIG. 7 is a schematic representation showing the position of nominal and actual receive beam positions in the dual receive beam scan of FIG. 2.

FIG. 7 shows a simulation of the geometric distortion effect. The vertical axis of FIG. 7 plots depth within the image; the horizontal axis shows azimuthal position, in normalized units. (In this case, the units are nominal scan lines). Ultrasound pulses are fired along ultrasound lines (not shown) at $(x_t) = \ldots -2,0,2 \ldots$ For each transmit ultrasound line at $(x_t)$, two receive beams are formed in parallel, at $(x_t +/- 0.5)$.

Thus the receive beams are regularly spaced at azimuthal coordinates $\ldots -2.5,-1.5,-0.5,0.5,1.5,2.5 \ldots$ The x's and o's in FIG. 7 show the actual center of mass of the detected beams as a function of range (in 20 mm increments). The o's represent the detected beams for the center transmit line, while the x's represent detected beams for adjacent transmit lines.

If the raw detected beams were passed to a scan converter and displayed, a severe artifact would result. The embodiments described below reduce or eliminate this artifact by using an interpolation process to estimate the value of the parameter being imaged (backscatter, velocity, etc.) along the nominal scan locations indicated by the dotted lines in FIG. 7, from the known detected beam data at distorted locations indicated by the x's and o's in FIG. 7.

Figure 8:
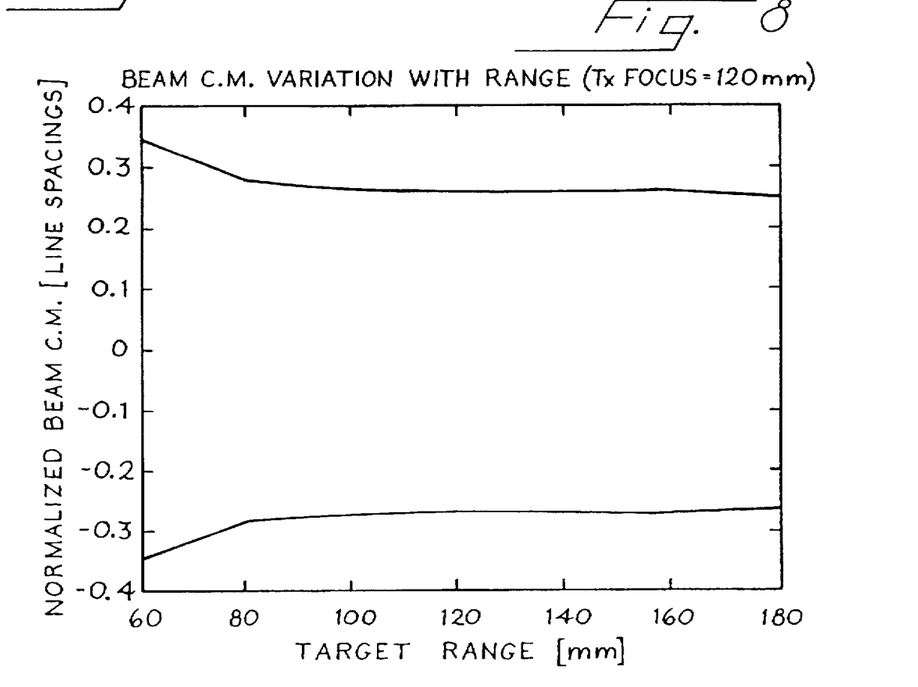
FIG. 8 is a graph showing the normalized beam center of mass as a function of range.

The beam center of mass for the two center beams is lotted in more detail in FIG. 8. In this case, the beam enter of mass varies somewhat with depth in the image. owever, near the transmit focus of 120 mm, the detected beam center of mass occurs at approximately $(x_t +/- x0), x0=0.25,$ instead of the nominal $(x_t +/- 0.5)$.

Note that for the 2-beam case, the single normalized parameter x0 may be used to characterize the geometric distortion.

Figure 9:
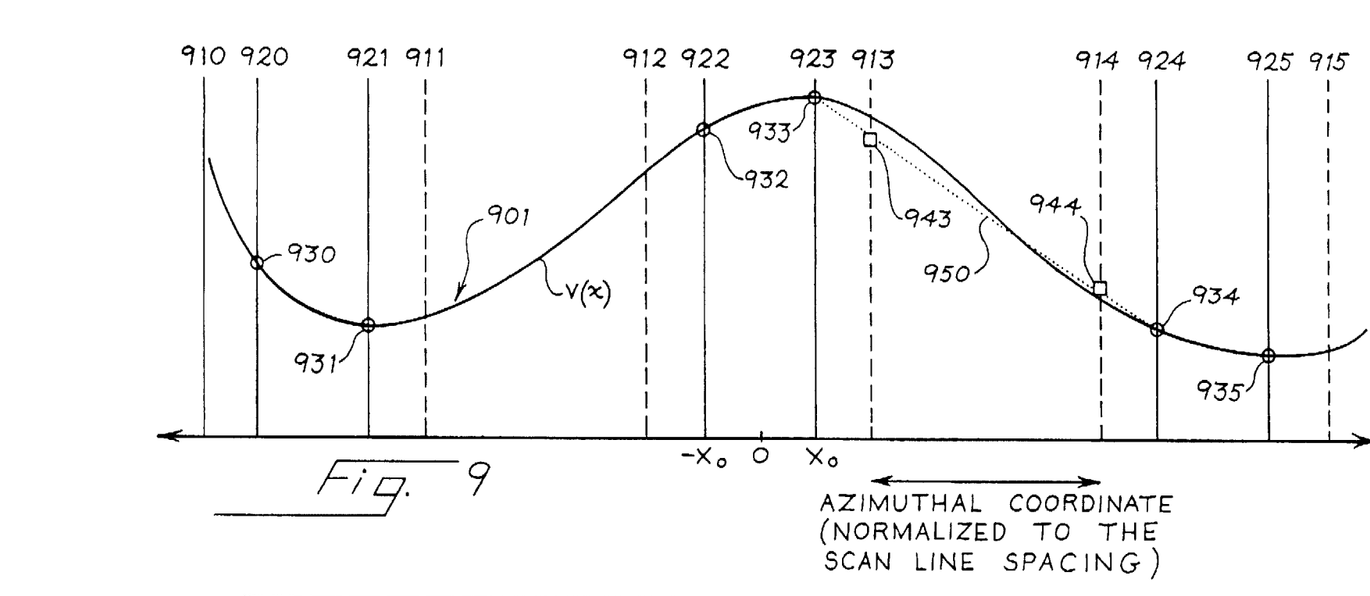
FIG. 9 is a graph illustrating the interpolation process performed by the preferred embodiments of this invention.

This case is shown in greater detail in FIG. 9. Curve 901 shows a plot of flow velocity V(x) vs normalized azimuthal coordinates as described above. Dashed lines 910,911,912, 913,914,915 indicate the nominal beam locations at which we would like to know the velocity. Solid lines 920,921, 922,923,924,925 indicate the actual locations at which we do know the flow velocity; and circles 930,931,932,933,934, 935, indicate the known flow velocity at these points. Squares 943 and 944 represent interpolated estimates of the flow velocity at locations 913 and 914, formed in this case by linear interpolation along the dotted straight line 950 between known flow velocities 933 and 934.

In this case, the known measurements lie at points $x\_act=2*n+/-x0= \ldots -x0,x0,2-x0,2+x0, \ldots ,$ where x0=0.25 at the transmit focus for the case plotted in FIG. 9; the nominal beam locations lie at $x\_nom=2*n+/-0.5=-0.5,0.5,1.5,2.5, \ldots$ To linearly interpolate between values V(xa) and V(xb) known at two points xa and xb to a value V(xhat) at some point between xa and xb we use $V(xhat)=(1-alpha)*V(xa)+alpha*V(xb),$ where alpha=(xa−xhat)/(xb−xa).

Applying this to the case discussed above, we note that we estimate the desired flow velocities as follows:

$V(0.5)=0*V(-x0)+(1-\text{alpha})*V(x0)+\text{alpha}*V(2-x0)$, $V(1.5)=\text{alpha}*V(x0)+(1-\text{alpha})*V(2-x0)+0*V(2+x0)$, $V(2.5)=0*V(2-x0)+(1-\text{alpha})*V(2+x0)+\text{alpha}*V(4-x0)$, where alpha=(0.5−x0)/(2−2*x0)=0.17 when x0=0.25.

This corresponds to a three-tap convolution filter whose coefficients alternate with beam between |0,1−alpha,alpha| and |alpha,1−alpha,0|.

In the preferred embodiment, the filter coefficients described above are generalized to add additional smoothing by adding a parameter beta. The form of the filter then becomes $V(0.5)$ = beta * $V(-x0)$ + (1 − alpha − beta) * $V(x0)$ + alpha * $V(2-x0)$ $V(1.5)$ = alpha * $V(x0)$ + (1 − alpha − beta) * $V(2-x0)$ + beta * $V(2+x0)$ $V(2.5)$ = beta * $V(2-x0)$ + (1 − alpha − beta) * $V(2+x0)$ + alpha * $V(4-x0)$.

Simply increasing beta without increasing alpha has the effect of shifting the center of mass of the flow estimates away from the nominal scan locations and back towards the actual beam locations. Thus any beta value is preferably accompanied by a corresponding alpha value. We can define the effective center of mass for our flow estimate V(0.5) as x_cm(alpha,beta,x0)=beta*(−x0)+(1−alpha−beta)*(x0)+ alpha*(2−x0).

If we then define alpha0=(0.5−x0)/(2−2*x0), we can then select alpha and beta such that x_cm(alpha,beta,x0)=x_cm(alpha0,0,x0), which leads to alpha=alpha0+(1−4*alpha0)*beta.

It is desirable to place some limits on beta. In the preferred embodiment, the constraint 1−alpha−beta>=max(alpha,beta), which reduces to beta>=(1−alpha0)/(3−4*alpha0), ensures that the filter kernel has its maximum value at the center tap. This avoids cases where the center kernel is less than the outer kernels, zero, or negative. Such less desirable cases emphasize high-frequency contents of the image and can result in a noisy image. In alternative embodiments, more or less severe constraints may be used. For example, the constraint 1−alpha−beta>=min(alpha,beta)

merely ensures that the kernel remain monotonic.

Table 1 presents a function in the well-known Matlab language that calculates the values of alpha and beta, and the effective center of mass for a normalized x0 and a desired beta.

TABLE 1

| function |alpha,beta,xcm|=bvf2(x0,beta); |
|---|
| alpha0=(0.5−x0)/(2−2*x); |
| beta_max=(1−alpha0)/(3−4*alpha0); |
| beta = min(beta,beta_max); |
| alpha = alpha0 + (1−4*alpha0).*beta; |
| xcm=beta*(−x0)+(1−alpha−beta)*(x0)+alpha*(2−x0); |

The values of alpha and beta may be calculated using the algorithms of Table 1, using either a value of x0 determined by simulations, or a nominal value of x0=0.25. In practice, however, the resulting values are merely a starting point.

Preferred values of alpha and beta may depend on a number of factors, including how well sampled the measured acoustic data is and the degree to which the geometric distortion x0 varies with range. Preferred values of alpha and beta are preferably determined by experimentation to produce a subjectively optimal image. However, the algorithms of Table 1 simplify this task. A preferred approach to selecting alpha and beta values is as follows:

Calculate an initial alpha0_init given x0_init,beta=0. For cases where the transmit and receive apertures are similar, it is appropriate to begin with x0_init=0.25.

Determine a subjectively preferred alpha0 at or near this alpha0_init.

If additional smoothing is desired, calculate an effective x0 that would give rise to such an alpha0:

x0=(2*alpha0−0.5)/(2*alpha0−1).

Use this new x0 to calculate alpha,beta pairs through the algorithms described above.

Alternately, if additional smoothing is desired, calculate the xcm for x0_init and the preferred alpha0 (with beta=0). Then use combinations of alpha and beta which retain the same center of mass.

The resulting coefficients (alpha, beta) may be used as is or further modified by experimentation.

This latter unit may be used to select beam-varying filter coefficients for a dual beam case. Suppose x0_init=0.25. Then the nominal value of alpha0=0.167. Coefficient sets such as alpha=0.125 beta=0.0 may be preferred subjectively, in which case alpha=0.1584, beta=0.10, calculated using the alternate method described above, will provide a similar amount of artifact reduction while further smoothing the image.

Similar approaches may be used to calculate beam-varying filter coefficients for systems in which 3, 4, or more receive beams are formed from each transmit beam. For the simplest case of 3 regularly spaced receive beams, the transmit beams are spaced at 3 times the desired display beam spacing. Receive beams are nominally spaced at x_nom=3*n+{−1,0,1}, in units normalized to the nominal beam spacing. However, the actual detected beams will be centered at x_act=3*n+{−x0,0,x0}, where x0=0.5 in the case where the transmit and receive beams are of equal width.

Because x_act ~=x_nom for the center beam, no interpolation is required to shift the center beam in each three-beam set. However, some smoothing is desirable in order to avoid an unpleasant artifact wherein the center beam stands out from the two outer beams. Hence, for this simplest 3-beam case, the following filter coefficients may be used:

$V(-1)=\text{alpha}*V(-3+x0)+(1-\text{alpha}-\text{beta})*V(-x0)+\text{beta}*V(0)$ $V(0)=\text{gamma}*V(-x0)+(1-2*\text{gamma})*V(0)+\text{gamma}*V(x0)$ $V(1)=\text{beta}*V(0)+(1-\text{alpha}-\text{beta})*V(x0)+\text{alpha}*V(3-x0)$ $V(2)=\text{alpha}*V(x0)+(1-\text{alpha}-\text{beta})*V(3-x0)+\text{beta}*V(3)$ $V(3)=\text{gamma}*V(3-x0)+(1-2*\text{gamma})*V(3)+\text{gamma}*V(3+x0)$ where alpha and beta may be determined by the Matlab function of Table 2.

TABLE 2

```
function [alpha,beta,xcm]=bvfx3(x0,beta);
  alpha0=(1-x0)/(3-2*x0);
  beta_max=1/3;
  beta=min(beta,beta_max);
  alpha = alpha0 + (1-3*alpha0).*beta;
  xcm=beta*(0)+(1-alpha-beta)*x0+alpha*(3-x0);
```

Gamma is preferably determined subjectively to best match each value of alpha and beta.

For a triple beam case with where x0=0.75, the above algorithms can be used to calculate the following values:

alpha=0.1666
beta=0.0.

However, the following coefficient sets have been subjectively preferred:

alpha=0.1328
beta=0.0
gamma=0.125
(for artifact reduction alone), and
alpha=0.1523
beta=0.0391
gamma=0.1719
(for an additional degree smoothing).

For the simplest 4-beam case, beams are nominally placed at x_nom=4*n+{-1.5,-0.5, 0.5, 1.5}, but are actually found at x_act=4*n+{-x2, -x1, x1, x2}.

The following filter coefficients may be used:

$V(-0.5)=\text{alpha\_in}*V(-x2)+(1-\text{alpha\_in}-\text{beta\_in})*V(-x1)+\text{beta\_in}*V(x1)$, $V(0.5)=\text{beta\_in}*V(-x1)+(1-\text{alpha\_in}-\text{beta\_in})*V(x1)+\text{alpha\_in}*V(x2)$, $V(1.5)=\text{beta\_out}*V(x1)+(1-\text{alpha\_out}-\text{beta\_out})*V(x2)+\text{alpha\_out}*V(4-x2)$, $V(2.5)=\text{alpha\_out}*V(x2)+(1-\text{alpha\_out}-\text{beta\_out})*V(4-x2)+\text{beta\_out}*V(4-x1)$, $V(3.5)=\text{alpha\_in}*V(4-x2)+(1-\text{alpha\_in}-\text{beta\_in})*V(4-x1)+\text{beta\_in}*V(4+x1)$.

The Matlab function of Table 3 may be used to estimate the filter parameters initially.

TABLE 3

```
function [alphaIn,betaIn,alphaOut,betaOut,xcmIn,xcmOut] =
bvfx3 (x1,x2,betaOut,betaIn);
  betaIn_max=max(x2-0.5/(2*x2), (x1+x2-1)/(3*x1+x2));
```

TABLE 3-continued

```
  betaOut_max=max((2.5-x2)/(8-3*x2-x1), 1/(4-2*x1));
  betaIn_max=min(betaIn_max, (x2+x1-1)/(4*x1));
  betaOut_max=min(betaOut_max, 1/(2*(x2-x1)));
  betaIn_max=max(0,min(0.5,betaIn_max));
  betaOut_max=max(0,min(0.5,betaOut_max));
  betaIn=min(betaIn,betaIn_max);
  betaOut=min(betaOut,betaOut_max);
  alphaIn=(0.5-x1+2*x1*betaIn)/(x2-x1);
  alphaOut=(1.5-x2+(x2-x1)*betaOut)/(4-2*x2);
  xcmIn=betaIn*(-x1)+(1-alphaIn-betaIn)*(x1)+alphaIn*(x2);
  xcmOut=betaOut*(x1)+(1-alphaOut-betaOut)*(x2)+alphaOut*(4-x2);
```

Note that for x1=0.25, x2=0.75, as occurs where the transmit and receive beam profiles are identical, alphaIn=0.5 and alphaOut=0.3. In practice, both alphaIn and alphaOut tend to be reduced considerably from these initial values after subjective evaluation. Additional smoothing may then be applied (via betaOut or especially betaIn). For the case of a vector probe using four-beams, the following coefficients prove useful:

alphaOut=0.2559
betaOut=0.0
alphaIn=0.498
betaIn=0.1133

DETAILED DESCRIPTION

Figure 1:
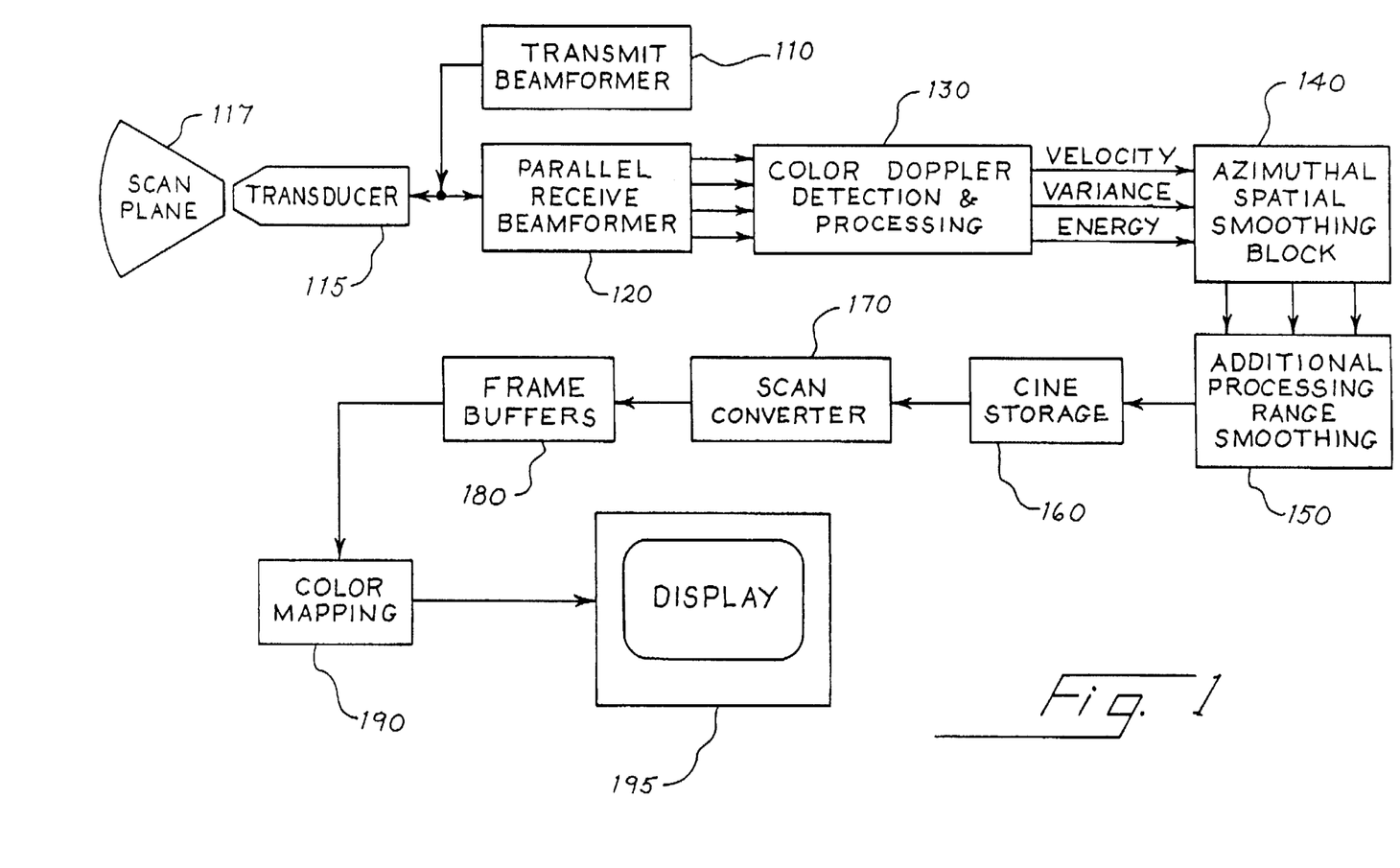
FIG. 1 is a block diagram of an ultrasound imaging system which incorporates a presently preferred embodiment of this invention.
Figure 2:
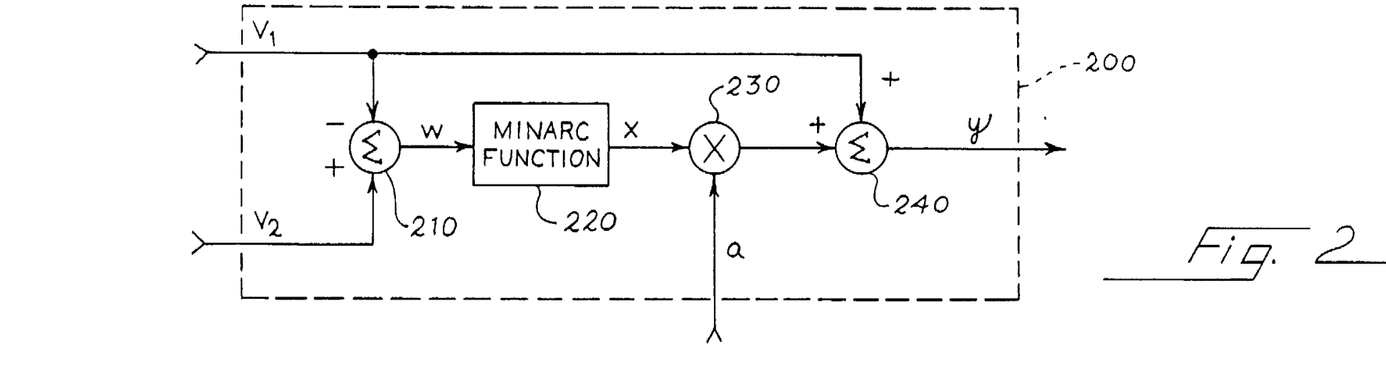
FIG. 2 is a more detailed block diagram of a filter block element 200 included in the azimuthal spatial smoothing block 140 of FIG. 1.
Figure 3:
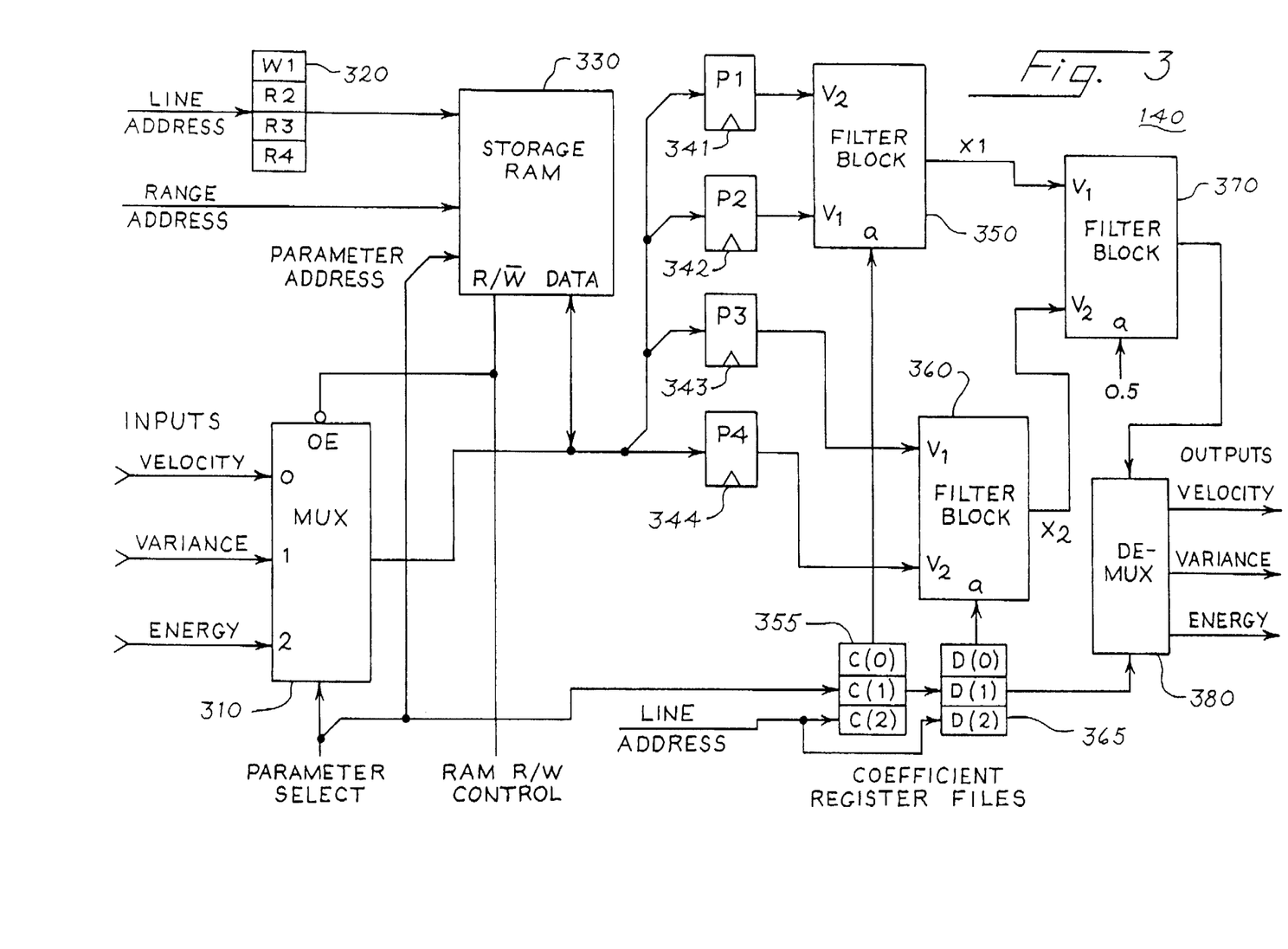
FIG. 3 is a detailed block diagram of the azimuthal spatial smoothing block 140 of FIG. 1.

Turning now to FIGS. 1–3, FIG. 1 shows a preferred azimuthal spatial smoothing block 140 in the processing chain of a typical color Doppler processing data path. All of the blocks in FIG. 1 are conventional except for the azimuthal spatial smoothing block 140. As is well known in the art, a transmit beamformer 110 applies phased signals to the respective transducer elements of a transducer 115 to cause transmit beams to propagate in a scan plane 117. Echoes from scatterers in the scan plane 117 return acoustic energy to the transducer 115, which supplies input signals to a parallel receive beamformer 120. In this embodiment, the beamformer 120 forms four simultaneous receive beams in parallel in response to each transmit beam. These four parallel receive beams are applied to a block 130 which performs color Doppler detection and processing. The block 130 generates output signals indicative of velocity of flow, variance, and energy for each of the four parallel receive beams. These signals are applied to the azimuthal spatial smoothing block 140, which is described in detail below in conjunction with FIGS. 2 and 3. The output signals of the azimuthal spatial smoothing block 140 are applied to a block 150 which performs additional processing such as range smoothing. The output signals from the block 150 are applied successively to a cine storage block 160, a scan converter 170, frame buffers 180, a color mapping block 190, and a display 195. As discussed above, the scan converter 170 is preferably of the conventional type which is adapted to operate with receive beams that are equally spaced in the azimuthal direction. For purposes of discussion, all blocks downstream of the beamformer 120 can be considered as part of a display system, and the display system includes the azimuthal spatial smoothing block or filter 140.

In this embodiment, the spatial filtering operation occurs in the acoustic domain, prior to scan conversion. This permits effective control of the filter coefficients as a function of azimuthal coordinate (beam number in this example).

FIG. 2 shows the internal function of a filter block element 200 that is used in the azimuthal spatial smoothing block 140. The two inputs to the element 200 are 8-bit. two's complement signed numbers which range from −1 to 127/128.

The element 200 includes a subtractor element 210 which subtracts the two inputs, v1 and v2, giving the intermediate result, w, which can range from −2 to 255/128. The value, w, is passed thru block 220, which applies the minarc function to w.

The minarc function is described by the following pseudocode:

if (w>=1.0)
　　x=w−2.0;
else if (w<−1.0)
　　x=w+2.0;
else
　　x=w;

The output of the block 220, x, is scaled by a multiplier 230. The scale factor is determined by a scaling coefficient, a, which ranges from 0 to 127/128. The output of the multiplier 230 is added to one of the inputs, v1, by an adder 240. The result, y, is an 8-bit signed two's complement number ranging from −1 to 127/128.

The filter block 200 effectively performs the operation:

$$y=a*\text{minarc}(v2-v1)+v1.$$

The minarc function is useful for better interpolation in the case where velocity parameter estimates are aliased. Rather than interpolating adjacent samples which have large magnitude and opposite sign through zero it is more accurate to interpolate through higher velocities.

When the inputs, v1 and v2, are limited to positive values, the operation performed by the filter block element 200 simplifies to y=(1−a)*v1+a*v2.

The preferred embodiment of the azimuthal spatial smoothing block 140 is shown in block diagram form in FIG. 3. The azimuthal spatial smoothing block is capable of filtering up to three adjacent lines of acoustic domain color Doppler parameters.

Up to 512 sets of color parameters for each line can be processed.

Block 310 multiplexes three color parameters onto a single 8-bit two's complement valued signal path. Since variance and energy are intrinsically unsigned parameters, the sign bit for each of these two parameters is forced to zero.

Storage RAM 330 is used to hold up to four lines of acoustic information. The line address register file 320 is used to generate addresses to write into the RAM as well as addresses to read data from the RAM into registers P1, P2, P3 and P4 (blocks 341, 343, 343, 344). Once all four registers have the necessary information from the storage RAM 330, filter block elements 350 and 360 operate simultaneously to produce intermediate filtered results X1 and X2 using weights stored in coefficient register files 355 and 365. Filter block element 370 performs a fixed equal weighting on X1 and X2 to produce a parameter multiplexed result. The filter block elements 350, 360, 370 are preferably constructed as described above in conjunction with FIG. 2.

Alternatively, a single filter block element may be time multiplexed to replace the three filter block elements 350, 360 and 370.

Block 380 demultiplexes the filtered results to produce three data streams containing corrected beam samples for velocity, variance, and energy parameter information.

The pseudocode of Appendix 1 shows the operation of the azimuthal spatial smoothing block 140.

As shown in the pseudocode of Appendix 1, the coefficients C(n) and D(n) are caused to vary as appropriate for the particular corrected beam being formed. In the 2-beam embodiment, the even beams (which are positioned to the left of the respective transmit beam) use a first set of coefficients, and the odd beams (to the right of the associated transmit beam) use a second set of coefficients. Similarly, for the 3-beam embodiment, each corrected beam is classified as one of three types, in accordance with whether that corrected beam is to the left of, aligned with, or to the right of the respective transmit beam. Each of these three types of beams receives a separate set of coefficients from the coefficient register files 355, 365.

Similarly, in a 4-beam embodiment, each of the corrected beams is divided into one of four types in accordance with its azimuthal position with respect to the associated transmit beam.

Each of these four types receives a respective set of coefficients from the coefficient register files 355, 365.

Figure 10:
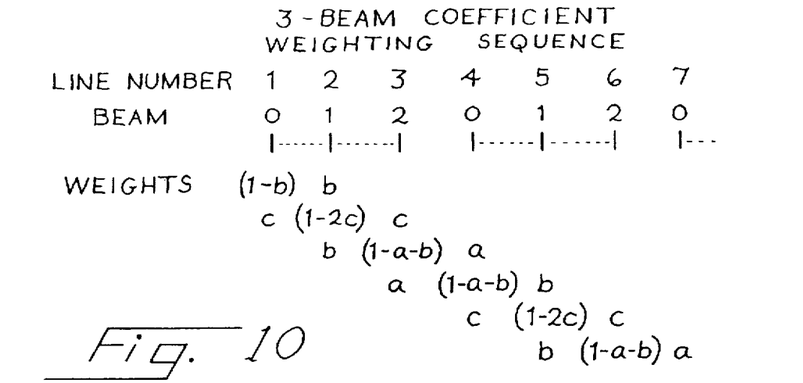
FIG. 10 is a schematic diagram showing a 3-beam coefficient weighting sequence.
Figure 11:
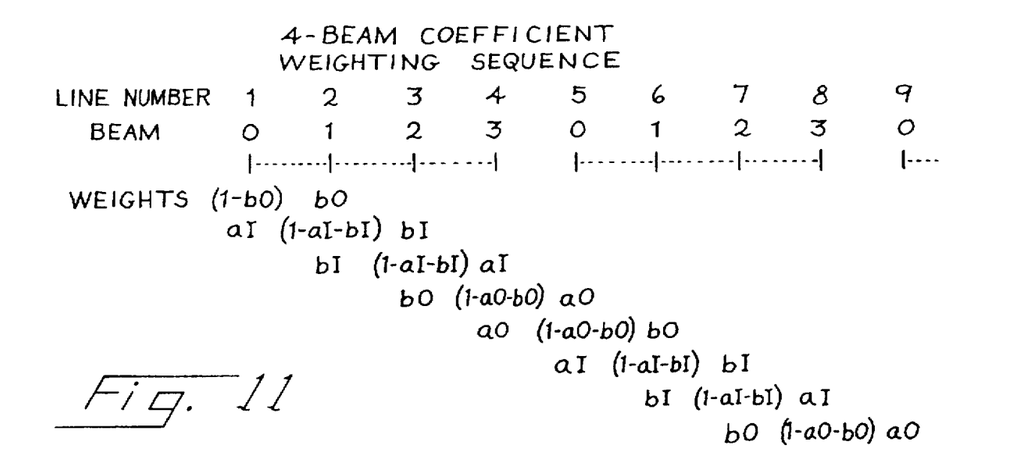
FIG. 11 is a schematic diagram showing a 4-beam coefficient weighting sequence.

FIGS. 10 and 11 show the coefficient weighting sequence generated by the pseudocode of Appendix 1 for the 3-beam and the 4-beam embodiments. Note that the weighting factors vary in accordance with line number (i.e., azimuthal coordinate) in the manner described above.

Thus, in this embodiment the coefficient register files 355, 365 in cooperation with the filter blocks 350, 360 form a means for varying the weighting factors used to form the corrected samples as a function of the azimuthal coordinate of the corrected beam or sample. Those skilled in the art will recognize that many other approaches can be used to achieve this result. For example, multiple sets of filter blocks can be provided, each with a dedicated set of coefficient register files, and the appropriate filter block set can be selected in accordance with the azimuthal coordinates of the corrected beam or sample. The means for varying the weighting factors can be implemented using either digital or analog techniques.

The azimuthal spatial smoothing block 140 functions as a means for generating corrected samples at the desired azimuthal coordinates. The smoothing block 140 performs this function by combining selected detected beam samples weighted with respective weighting factors. As pointed out above, these weighting factors are preferably selected as a function of the azimuthal coordinates of the corrected beam or sample. Because the detected beam samples are not equally spaced, improved results can be obtained by varying the weighting factors as a function of the azimuthal coordinates, rather than by using the same weighting factors throughout the azimuthal range.

The corrected samples supplied at the outputs of spatial smoothing block 140 of FIG. 3 are supplied to the scan converter 170 via intermediate processing blocks 150, 160. Thus, the blocks 150, 160 operate as a means for supplying the corrected samples to the scan converter. The particular components included in the means for supplying the samples to the scan converter can vary widely, depending upon the application.

In the simplest case, this means can include a simple conductor or other communication medium which serves to transmit the corrected samples directly to the scan converter. More typically, any appropriate intermediate processing blocks can be included to perform this supplying function.

Table 4 shows the processing sequencing that results from the pseudocode of Appendix 1 when used in 4-beam processing. Table 5 shows the processing sequencing for 3-beam processing. Both Tables 4 and 5 show examples with 12 lines in a frame. In these tables the variables W1, R2, R3, R4, C(n) and D(n) correspond to respective parameters of FIG. 3.

TABLE 4

4-beam Processing Sequencing

| I | beam | line address sequence | | | | coeff sequence | | result |
|---|------|----|----|----|----|--------|--------|--------|
|   |      | W1 | R2 | R3 | R4 | C(n)   | D(n)   | line number |
| 1 | 0 | 0 | 0 | 0 | 0 | —       | —       | discard |
| 2 | 1 | 1 | 0 | 0 | 0 | 2*aO(n) | 2*bO(n) | 1 |
| 3 | 2 | 2 | 1 | 1 | 0 | 2*aI(n) | 2*bI(n) | 2 |
| 4 | 3 | 3 | 2 | 2 | 1 | 2*bI(n) | 2*aI(n) | 3 |
| 5 | 0 | 0 | 3 | 3 | 2 | 2*bO(n) | 2*aO(n) | 4 |
| 6 | 1 | 1 | 0 | 0 | 3 | 2*aO(n) | 2*bO(n) | 5 |
| 7 | 2 | 2 | 1 | 1 | 0 | 2*aI(n) | 2*bI(n) | 6 |
| 8 | 3 | 3 | 2 | 2 | 1 | 2*bI(n) | 2*aI(n) | 7 |
| 9 | 0 | 0 | 3 | 3 | 2 | 2*bO(n) | 2*aO(n) | 8 |
| 10 | 1 | 1 | 0 | 0 | 3 | 2*aO(n) | 2*bO(n) | 9 |
| 11 | 2 | 2 | 1 | 1 | 0 | 2*aI(n) | 2*bI(n) | 10 |
| 12 | 3 | 3 | 2 | 2 | 1 | 2*bI(n) | 2*aI(n) | 11 |
| flush 13 | 3 | 0 | 3 | 3 | 2 | 2*bO(n) | 2*aO(n) | 12 |

TABLE 5

3-beam Processing Sequencing

| I | beam | line address sequence | | | | coeff sequence | | result |
|---|------|----|----|----|----|--------|--------|--------|
|   |      | W1 | R2 | R3 | R4 | C(n)   | D(n)   | line number |
| 1 | 0 | 0 | 0 | 0 | 0 | —      | —      | discard |
| 2 | 1 | 1 | 0 | 0 | 0 | 2*a(n) | 2*b(n) | 1 |
| 3 | 2 | 2 | 1 | 1 | 0 | 2*c(n) | 2*c(n) | 2 |
| 4 | 0 | 3 | 2 | 2 | 1 | 2*b(n) | 2*a(n) | 3 |
| 5 | 1 | 0 | 3 | 3 | 2 | 2*a(n) | 2*b(n) | 4 |
| 6 | 2 | 1 | 0 | 0 | 3 | 2*c(n) | 2*c(n) | 5 |
| 7 | 0 | 2 | 1 | 1 | 0 | 2*b(n) | 2*a(n) | 6 |
| 8 | 1 | 3 | 2 | 2 | 1 | 2*a(n) | 2*b(n) | 7 |
| 9 | 2 | 0 | 3 | 3 | 2 | 2*c(n) | 2*c(n) | 8 |
| 10 | 0 | 1 | 0 | 0 | 3 | 2*b(n) | 2*a(n) | 9 |
| 11 | 1 | 2 | 1 | 1 | 0 | 2*a(n) | 2*b(n) | 10 |
| 12 | 2 | 3 | 2 | 2 | 1 | 2*c(n) | 2*c(n) | 11 |
| flush 13 | 2 | 0 | 3 | 3 | 2 | 2*b(n) | 2*a(n) | 12 |

Selected ones of the parameters of Tables 4 and 5 and FIGS. 10 and 11 correspond to selected ones of the parameters of the general discussion as shown in Table 6.

TABLE 6

| Parameter from General Discussion | Parameter from Appendix 1, Tables 4, 5, FIGS. 10, 11 |
|---|---|
| alpha | a(0), a(1), a(2) |
| beta | b(0), b(1), b(2) |
| gamma | c(0), c(1), c(2) |
| alpha_in | aI(0), aI(1), aI(2) |
| alpha_out | aO(0), aO(1), aO(2) |
| beta_in | bI(0), bI(1), bI(2) |
| beta_out | bO(0), bO(1), bO(2) |

ALTERNATIVE EMBODIMENTS AND CONCLUSION

From the foregoing, it should be apparent that the preferred embodiments discussed above provide an enhanced azimuthal spatial filtering function. This is because the azimuthal spatial filtering uses filter weights which vary as a function of the azimuthal coordinate of the receive beams.

The embodiments discussed above perform the azimuthal spatial filtering function on detected beam samples, prior to scan conversion. In alternate embodiments, the azimuthal spatial filtering may be performed at other portions of the signal processing system. For example, if desired the azimuthal filtering described above can be adapted to function with analytic receive signals, after beamforming but prior to detection. Similarly, if desired the azimuthal filtering function described above can be applied to the appropriate signals after scan conversion has been completed or as part of the conversion process. The term "input signal derived from a receive beam" is intended to be interpreted broadly to cover all signals downstream of the receive beamformer that are responsive to or that vary as a function of the receive beam.

The present invention is not limited to three-tap spatially-varying filters. Longer filters may be used, providing improved artifact reduction at the cost of increased computation and/or memory requirements. The problem of interpolating from irregularly sampled data to regularly sampled data has been well-studied, and one skilled in the art has many means of choosing coefficients for such a longer filter. For example, Ronald Bracewell, in "The Fourier Transform and Its Applications",pp 201–202, discusses reconstruction of a continuous waveform from interlaced sampling. Because reconstruction of a discretely sampled waveform can be thought of as reconstruction of a continuous waveform at discrete points, the approach described here may be used to generate an arbitrary number of filter coefficients.

Figure 12:
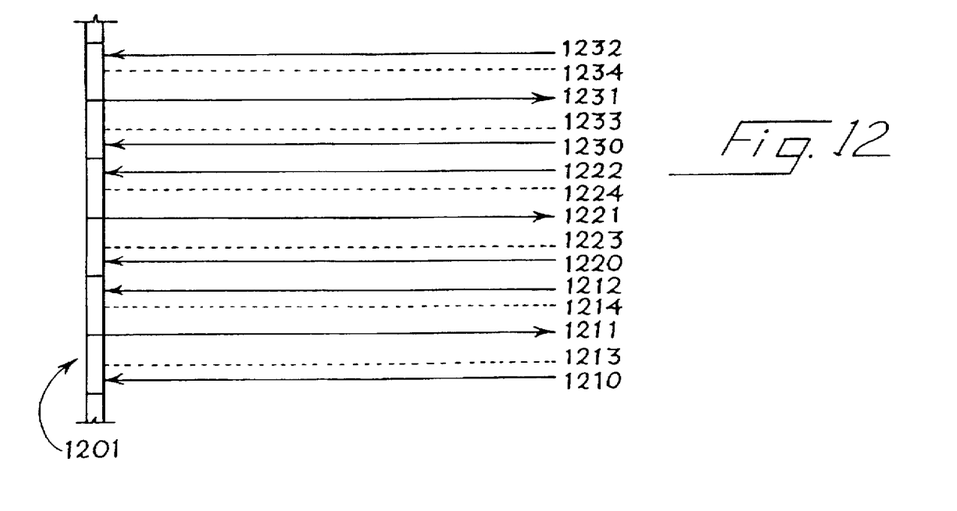
FIG. 12 is a schematic diagram of a dual receive beam scan with irregularly spaced intervals between beams.

The preceding discussion has assumed that the receive beams are regularly spaced. It is possible to acquire an image using irregularly spaced intervals between receive beams. In this case, the spacings between beams associated with a given transmit line may be increased or decreased (for example, to reduce artifacts associated with reduced sensitivity of the outermost beams). However, though the data arises from irregularly spaced receive beams, the detected and processed data is to be displayed along regularly spaced scan lines. FIG. 12 illustrates such a case. Ultrasound pulses are transmitted from transducer array 1201 along transmit ultrasound lines 1211 and a parallel beamformer generates two receive beams, focused along ultrasound lines 1210 and 1212. The process is then repeated with transmission along transmit line 1221 and reception focused along lines 1220 and 1222, and so forth. Here the detected data is acquired associated with irregularly spaced receive lines 1210, 1212, 1220, 1222, 1230, 1232. However, the scan converter expects data along regularly spaced scan lines 1213, 1214, 1223, 1224, 1233, 1234.

The filtering methods discussed above may be used to good advantage in the case where receive beams are irregularly spaced. In this case, the center of mass of the round trip response resulting from each pair of transmit lines and receive lines is calculated and normalized to the spacing between display scan lines, exactly as discussed above. This normalized line spacing is then used to calculate filter coefficients using the methods and algorithms discussed above.

For example, in FIG. 12 two receive beams are formed for each transmit line, and the spacing between these receive beams (such as 1210, 1214) is 1.5 times the spacing between display lines (such as 1213, 1214). If the transmit and receive beam profiles are identical, the center of mass of the round-trip responses will lie at +/−⅛ of the display line spacing. Thus x0=0.375 may be used in equations preceding Table 1 and as an argument to the Matlab function of Table 1 to determine filter coefficients appropriate for this case of irregularly spaced receive beams.

Other alternatives to the embodiments described above relate to the details of the azimuthal filtering. The preferred embodiments described above use linear filtering techniques. However, this invention is not limited to any particular filtering technique, and the widest variety of techniques can be adapted for use with this invention.

Also, the embodiments described above utilize filter coefficients which vary only with the azimuthal coordinate of the receive beam samples. As pointed out above, the geometric distortion effect may vary with range, in view of the changing shape of the beams with range. For this reason, it may be desirable in some embodiments to select filter coefficients as a function both of range and azimuthal coordinates of the corrected samples.

The embodiments described above utilize digital signal processing techniques to accomplish the desired filtering. Of course, this invention is not limited to such digital techniques, and the widest variety of filtering technologies can be used to implement this invention. For example, analog filters may be adapted for appropriate embodiments.

In view of many alternative embodiments that are possible for the present invention, it is intended that the foregoing detailed description be regarded only as a illustration, and not as a limitation. It is only the following claims, including all equivalents, which are intended to define the scope of this invention.

APPENDIX 1

```
% pseudocode for azimuthal spatial filter processing sequence
% For three tap filter, set pipeline length = 1
pipeline_length = 1
for l=1 to number_of_lines_in_frame + pipeline_length
    /*
     * determine beam number
     */
    if l <= number_of_lines_in_frame
        beam =   ( l - 1 ) mod number_of_beams
        readout_line = l
    else /* pipeline flush case */
        beam =   ( number_of_beams - pipeline_length ) mod
number_of_beams
        readout_line = number_of_lines_in_frame  /* re-read last
line */
    /*
     * compute line number sequence
     */
    W1 = l-1 mod 4;
    R2 = max(1-2,0) mod 4;
    R3 = R2;
    R4 = max(1-3,0) mod 4;
    /* compute coefficients based on beam number */
    if (number_of_beams==2)
    {
        if (beam==0)
            C(0) = b(0) * 2.0;
            D(0) = a(0) * 2.0;
            C(1) = b(1) * 2.0;
            D(1) = a(1) * 2.0;
            C(2) = b(2) * 2.0;
            D(2) = a(2) * 2.0;
        else /* (beam==1) */
            C(0) = a(0) * 2.0;
            D(0) = b(0) * 2.0;
            C(1) = a(1) * 2.0;
            D(1) = b(1) * 2.0;
            C(2) = a(2) * 2.0;
            D(2) = b(2) * 2.0;
    }
    else if (number_of_beams==3)
    {
        if (beam==0)
            C(0) = b(0) * 2.0;
            D(0) = a(0) * 2.0;
            C(1) = b(1) * 2.0;
            D(1) = a(1) * 2.0;
            C(2) = b(2) * 2.0;
```

APPENDIX 1-continued

```
            D(2) = a(2) * 2.0;
        else if (beam==1)
            C(0) = a(0) * 2.0;
            D(0) = b(0) * 2.0;
            C(1) = a(1) * 2.0;
            D(1) = b(1) * 2.0;
            C(2) = a(2) * 2.0;
            D(2) = b(2) * 2.0;
        else /* (beam==2) */
            C(0) = c(0) * 2.0;
            D(0) = c(0) * 2.0;
            C(1) = c(1) * 2.0;
            D(1) = c(1) * 2.0;
            C(2) = c(2) * 2.0;
            D(2) = c(2) * 2.0;
    }
    else if (number_of_beams==4)
    {
        if (beam==0)
            C(0) = bO(0) * 2.0;
            D(0) = aO(0) * 2.0;
            C(1) = bO(1) * 2.0;
            D(1) = aO(1) * 2.0;
            C(2) = bO(2) * 2.0;
            D(2) = aO(2) * 2.0;
        else if (beam==1)
            C(0) = aO(0) * 2.0;
            D(0) = bO(0) * 2.0;
            C(1) = aO(1) * 2.0;
            D(1) = bO(1) * 2.0;
            C(2) = aO(2) * 2.0;
            D(2) = bO(2) * 2.0;
        else if (beam==2)
            C(0) = aI(0) * 2.0;
            D(0) = bI(0) * 2.0;
            C(1) = aI(1) * 2.0;
            D(1) = bI(1) * 2.0;
            C(2) = aI(2) * 2.0;
            D(2) = bI(2) * 2.0;
        else (beam==3)
            C(0) = bI(0) * 2.0;
            D(0) = aI(0) * 2.0;
            C(1) = bI(1) * 2.0;
            D(1) = aI(1) * 2.0;
            C(2) = bI(2) * 2.0;
            D(2) = aI(2) * 2.0;
    }
    /*
     * process a line of flow parameters
     */
    for r = 1 to number_of_range_samples
        /* do three parameters */
        for p = 0 to 2
    parameter_select = p; /* 0=velocity, 1=variance, 2=energy */
    get new parameter from previous processing stages for range
            sample r and line l of a frame. If l is greater than
            the number of actual lines in the frame, then re-read
            the last actual line.
    write new parameter for range sample r into Storage RAM 330
            with parameter address p, and with the W1 line address
            from register file 320.
    write new parameter and into register P1, 341.
    read parameter from RAM 330 with range sample address r
            with parameter address p and line address R2 and write
            into register P2, 342.
    read parameter from RAM 330 with range sample address r
            with parameter address p and line address R3 and write into
    register P3, 343.
    read parameter from RAM 330 with range sample address r
            with parameter address p and line address R4 and write
            into register P4, 344.
    /* filter the parameter data */
    X1 = C(p) * minarc(P1-P2) + P2; /* block 350 */
    X2 = D(p) * minarc(P4-P3) + P3; /* block 360 */
    Result = 0.5 * minarc(X1-X2) + X1; /* block 370 */
    /* demultiplex the result -- block 380 */
    if (p==0)
        output velocity = Result;
    else if (p==0)
```

APPENDIX 1-continued

```
        output variance = Result;
    else
        output energy = Result;
    next p;
next r;
if 1-pipeline_length > 0
    result line number is ( 1 - pipeline_length );
else
    discard result
next 1;
```

We claim:

1. An ultrasound multi-beam distortion correction system for an ultrasound imaging system comprising a transmit beamformer for generating a sequence of transmit beams, a receive beamformer operative to acquire multiple receive beams from each respective transmit beam, wherein each receive beam is associated with a respective azimuthal coordinate, and a display system responsive to the receive beams, said correction system comprising:

a spatial filter responsive to input signals derived from the receive beams to generate a corrected signal output as a function of a plurality of the receive beams and a plurality of filter weights; and means for selecting the filter weights applied by the spatial filter to the input signals to cause the filter weights to vary in accordance with the azimuthal coordinates of the selected plurality of receive beams to reduce artifacts associated with multiple receive beam groupings.

2. The invention of claim 1 further comprising a detector wherein the input signals are responsive to the detector, and a scan converter wherein the corrected signal output is coupled to the scan converter.

3. The invention of claim 1 wherein the selected filter weights cause the corrected signal output to be more evenly spaced in azimuthal location than the receive beams.

4. The invention of claim 1 wherein the selecting means selects the filter weights applied by the spatial filter to the input signals in sets, wherein at least some of the filter weights within each set differ from one another, wherein each set is associated with a respective corrected beam, and wherein the sets vary cyclically across a plurality of the corrected beams.

5. An ultrasound multi-beam distortion correction system for an ultrasound imaging system comprising a transmit beamformer for generating a sequence of transmit beams, a receive beamformer operative to acquire multiple receive beams from each respective transmit beam, a detector responsive to the receive beams to produce detected beam samples, and a scan converter, said correction system comprising:

means, responsive to a plurality of detected beam samples, for generating corrected samples at desired coordinates having reduced artifacts associated with multiple receive beam groupings; and means for supplying the corrected samples to a scan converter.

6. The invention of claim 5 wherein the generating means comprises a spatial filter and means for supplying selected ones of the detected beam samples to the spatial filter.

7. The invention of claim 6 wherein each of the corrected beam samples is associated with a respective azimuthal coordinate, wherein the spatial filter comprises a plurality of weighting factors, and wherein the generating means comprises means for varying the weighting factors of the spatial filter in accordance with at least the azimuthal coordinates of the respective corrected beam samples.

8. The invention of claim 5 wherein the corrected beam samples are each associated with a respective azimuthal coordinate, and wherein the generating means comprises means for combining selected ones of the detected beam samples weighted by respective weighting factors, said weighting factors varying as in accordance with at least the azimuthal coordinates of the respective corrected beam samples.

9. The invention of claim 5 wherein the corrected samples are more evenly spaced in azimuthal location than the receive beams.

10. A method for correcting multi-beam distortion in an ultrasound imaging system comprising a transmit beamformer for generating a sequence of transmit beams, a receive beamformer operative to acquire multiple receive beams for each respective transmit beam, wherein each receive beam is associated with a respective azimuthal coordinate, said method comprising the following steps:

spatially filtering input signals derived from the receive beams to generate a corrected signal output as a function of a selected plurality of the receive beams and a plurality of filter weights, wherein the filter weights vary in accordance with the azimuthal coordinates of the selected plurality of the receive beams to reduce artifacts associated with multiple receive beam groupings; and supplying the corrected signal output to a display system.

11. The method of claim 10 wherein the display system comprises a detector responsive to the receive beams and a scan converter, wherein the input signals are responsive to the detector, and wherein the corrected signal output is supplied to the scan converter.

12. The method of claim 10 wherein the filter weights cause the corrected signal output to be more evenly spaced in azimuthal location than the receive beams.

13. The method of claim 10 wherein the corrected signal output is arranged in corrected beams, wherein the filtering step organizes the filter weights in sets, wherein at least some of the filter weights within each set differ from one another, wherein each set is associated with a respective corrected beam, and wherein the sets vary cyclically across a plurality of the corrected beams.

14. A method for correcting detected beam samples prior to scan conversion in an ultrasound imaging system comprising a transmit beamformer for generating a sequence of transmit beams, a receive beamformer operative to acquire multiple receive beams from each respective transmit beam, a detector responsive to the receive beams to produce detected beam samples, and a scan converter, said method comprising the following steps:

generating corrected samples at desired coordinates in response to the detected beam samples, said corrected samples having reduced artifacts associated with multiple receive beam groupings; and supplying the corrected samples to the scan converter.

15. The method of claim 14 wherein the corrected beam samples are each associated with a respective azimuthal coordinate, and wherein the generating step comprises the step of combining selected ones of the detected beam samples weighted by respective weighting factors, said weighting factors varying in accordance with the azimuthal coordinates of the respective corrected beam samples.

16. A method for correcting detected beam samples prior to scan conversion in an ultrasound imaging system comprising a transmit beamformer for generating a sequence of transmit beams, a receive beamformer operative to acquire multiple receive beams from each respective transmit beam, a detector responsive to the receive beams to produce detected beam samples, and a scan converter, said method comprising the following steps:

selecting a plurality of weighting factors in accordance with at least an azimuthal coordinate;

filtering selected ones of the detected beam samples weighted by respective ones of the selected weighting factors to form a plurality of corrected samples, said corrected samples having reduced artifacts associated with multiple receive beam groupings; and supplying the corrected samples to the scan converter.

17. The method of claim 9 or 16 wherein the corrected samples are more evenly spaced in azimuthal location than the receive beams.

* * * * *